United States Patent [19]
Isaji et al.

[11] Patent Number: 5,316,074
[45] Date of Patent: May 31, 1994

[54] AUTOMOTIVE HAIR CONDITIONER

[75] Inventors: Akira Isaji, Nishio; Kunio Iritani; Nobunao Suzuki, both of Anjo, all of Japan

[73] Assignee: Nippondenso, Co., Ltd., Kariya, Japan

[21] Appl. No.: 773,327

[22] Filed: Oct. 11, 1991

[30] Foreign Application Priority Data

Oct. 12, 1990 [JP] Japan ................................. 2-274845
Oct. 12, 1990 [JP] Japan ................................. 2-274846

[51] Int. Cl.$^5$ .............................................. F25B 27/00
[52] U.S. Cl. ................................. 165/43; 62/228.4; 62/323.3
[58] Field of Search .................. 62/160, 526, 229, 95, 62/198, 228.4, 323.3; 165/43

[56] References Cited

U.S. PATENT DOCUMENTS

| | | | |
|---|---|---|---|
| 3,278,111 | 10/1966 | Parker | 417/32 |
| 3,304,735 | 2/1967 | Alexander | 62/160 |
| 3,584,279 | 6/1969 | Krauthamer | 318/808 |
| 4,006,603 | 2/1977 | Miles | 62/229 |
| 4,510,763 | 4/1985 | Johnson | 62/228.3 |
| 4,870,833 | 10/1989 | Matsuda et al. | 62/228.4 |
| 4,934,151 | 6/1990 | Suzuki et al. | 62/229 X |

FOREIGN PATENT DOCUMENTS

| | | | |
|---|---|---|---|
| 0042841 | 4/1979 | Japan | 62/198 |
| 0018046 | 2/1983 | Japan | 62/230 |
| 60-2847 | 1/1985 | Japan . | |
| 60-29558 | 2/1985 | Japan . | |
| 0078811 | 5/1985 | Japan | 62/227 |

*Primary Examiner*—William E. Wayner
*Attorney, Agent, or Firm*—Cushman, Darby & Cushman

[57] ABSTRACT

An automotive air conditioner comprises a refrigerating unit including a compressor, for carrying out a refrigerating cycle, and a temperature regulator for setting the temperature of air to be blown into the passenger compartment of an automobile. The rotating speed of the compressor, hence the flow rate of the refrigerant, is regulated by controlling an inverter for controlling an electric motor for driving the compressor according to a temperature set by the temperature regulator. The automatic air conditioner is suitable for use on an electric motorcar.

9 Claims, 12 Drawing Sheets

5,316,074

AUTOMOTIVE HAIR CONDITIONER

BACKGROUND OF THE INVENTION

1. Field of the Invention

The present invention relates to an automotive air conditioner and, more particularly, to an automotive air conditioner suitable for use on an automobile that has no heat source like a heat engine, such as an electric motorcar.

2. Description of the Prior Art

Referring to FIG. 18, a conventional automotive air conditioner is provided with a blower 2 disposed within a duct 1 to generate air flow through the duct 1. The air flowing through the duct 1 is cooled by an evaporator 3 to provide cool air. The cool air is heated by a heater core 4, which uses hot water as its heating medium, disposed downstream of, as after the evaporator 3, with respect to the flowing direction of the cool air. The mixing ratio of air that flows through the heater core 4 and air that bypasses the heater core 4 is regulated by an air mix damper 5 disposed near the heater core 4 to mix the air heated by the heater core 4 and the air bypassed the heater core 4 properly to provide air of a desired temperature.

This automotive air conditioner necessarily needs hot water, such as hot engine cooling water to heat air by the heater core 4. Accordingly, the automotive air conditioner is unable to reheat air properly when used on an automobile not having any hot water source, such as an electric motorcar, and hence it is difficult for the automotive air conditioner to control the temperature of the air to be blown into the passenger compartment properly.

Another conventional automotive air conditioner controls the temperature of air to be blown through an evaporator and a duct into the passenger compartment for cooling operation by interrupting the operation of a compressor instead of using the heater core 4. However, since the compressor of this automotive air conditioner is driven by the engine of the automobile, the interruption of the operation of the compressor changes the load on the engine sharply, sacrificing the comfort of the passengers.

A third conventional automotive air conditioner controls the temperature of air cooled by the evaporator 3 by varying the discharge capacity of the compressor in addition to the interruption of operation of the compressor. However, the operating speed of the compressor cannot be controlled independently of the operating speed of the engine because the compressor is driven by the engine.

The compressor of a domestic air conditioner, for instance, is controlled for constant operation. The domestic air conditioner is installed rarely so that cool air is blown directly toward the human body and hence the domestic air conditioner does not control the temperature of cool air to be blown into the room. A domestic air conditioner provided with an inverter or the like for controlling the operating speed of the compressor detects thermal load on the basis of the difference between the room temperature and a set temperature and controls the operating speed of the compressor according to the thermal load.

SUMMARY OF THE INVENTION

It is an object of the present invention to provide an automotive air conditioner to be installed so that air is blown directly toward the passenger, capable of controlling the temperature of air to be blown without using any heating means using the waste heat of the engine, such as a hot water radiator.

Another object of the present invention is to provide an automotive air conditioner capable of controlling both the temperature and humidity of air to be blown without using the waste heat of an internal combustion engine.

A further object of the present invention is to provide an automotive air conditioner capable of simultaneously controlling the humidity and temperature of air to be blown in a heating mode.

In a first aspect of the present invention, an automotive air conditioner controls the rotating speed of a compressor by compressor control means to control the flow rate of a refrigerant that circulates through a refrigeration circuit so that the heat exchanging ability of an internal heat exchanger is varied. The heat exchanging ability of the internal heat exchanger is controlled through the control of the compressor control means by temperature control means principally on the basis of a signal provided by temperature regulating means that sets a desired temperature for air to be blown.

In a second aspect of the present invention, an automotive air conditioner is provided with a first internal heat exchanger, a second internal heat exchanger, and pressure reducing means for dehumidification disposed between the first and second internal heat exchangers.

In a third aspect of the present invention, an automotive air conditioner is provided with a blower, a duct for carrying air blown by the blower into the passenger compartment, a first internal heat exchanger disposed within the duct, and a second internal heat exchanger disposed within the duct at a position after the first internal heat exchanger with respect to the flowing direction of air.

In a fourth aspect of the present invention, an automotive air conditioner is provided with a first internal heat exchanger, a second internal heat exchanger, a compressor for discharging a refrigerant into the second internal heat exchanger, compressor control means capable of optionally changing the rotating speed of the compressor, and temperature control means for controlling the temperature of air to be blown through the control of the compressor control means on the basis of a signal provided by temperature regulating means or the like for the variable speed control of the compressor.

In the automotive air conditioner in accordance with the present invention, the temperature control means gives a signal to the compressor control means according to a signal provided by a temperature regulating means to control the rotating speed of the compressor independently of the rotating speed of the engine of the automobile, so that the flow rate of the refrigerant that circulates through the refrigeration circuit can properly be controlled. Accordingly, the variable control of heat absorbed by the evaporation of the refrigerant in the internal heat exchangers in the cooling mode can be achieved, and the variable control of heat generated by the condensation of the refrigerant in the internal heat exchangers in the heating mode can be achieved.

Thus, the automotive air conditioner in accordance with the present invention is capable of controlling the temperature of air to be blown into the passenger compartment in a wide temperature range for both air cooling operation and air heating operation without using any hot water heat exchanger and the heat of the engine cooling water circulating through the engine of the automobile, so that air of an appropriate temperature is blown through air outlet openings toward the passengers for comfortable air conditioning.

Furthermore, the automotive air conditioner in accordance with the present invention is capable of satisfactory dehumidification during heating operation. Accordingly, air to be blown into the passenger compartment can satisfactorily dehumidified even if dehumidification is necessary in winter in which cooling operation is undesirable.

Still further, the automotive air conditioner in accordance with the present invention is capable of controlling the rotating speed of the compressor to control the temperature of air to be blown through the air outlet openings toward the passengers and of controlling the temperature of air to be blown into the passenger compartment according to the thermal load even when dehumidification is necessary. Moreover, air to be blown into the passenger compartment can properly be dehumidified by controlling the rate of dehumidification through the control of the discharge rate of the compressor by the compressor control means.

DETAILED DESCRIPTION OF THE PREFERRED EMBODIMENT

Preferred embodiments of the present invention will be described hereinafter with reference to the accompanying drawings.

Figure 1:
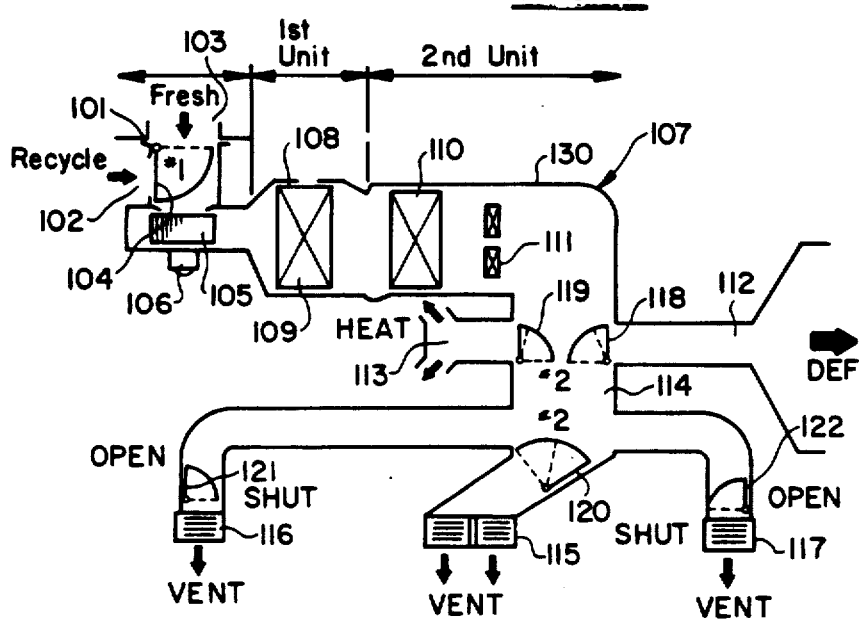
FIG. 1 is a diagrammatic view of an internal unit included in an automotive air conditioner in a first embodiment according to the present invention.

Referring to FIG. 1 showing an internal unit included in an automotive air conditioner in a first embodiment according to the present invention, an air select device 101 has a damper 104 for selectively opening either a recirculating air inlet 102 for the recirculating air or a fresh air inlet 103 for fresh air.

A blower 105 is driven by a blower motor 106 to blow the recirculating air or fresh air taken in through the air select device 101 into a duct 107 consisting of a first duct unit 108 and a second duct unit 130. A first internal heat exchanger 109 is provided within the first duct unit 108.

A second internal heat exchanger 110 and an auxiliary heater 111 are disposed within the second duct unit 130. The auxiliary heater 111 comprises, for example, two 500 W PTC heating units.

The second duct unit 130 has a defrosting air outlet 112 through which air is blown against the windshield of the automobile, a heating air outlet 113 through which air is blown toward the feet of the passengers, and an upper air outlet 114 through which air is blown toward the passengers' upper bodies. The upper air outlet 114 is connected by branch air ducts to a central air outlet 115 opening into the central region of the passenger compartment of the automobile and side air outlets 116 and 117 opening respectively into the opposite side regions of the passenger compartment. Dampers 118 to 122 are disposed respectively near the air outlets 112, 113, 115, 116 and 117.

Figure 2:
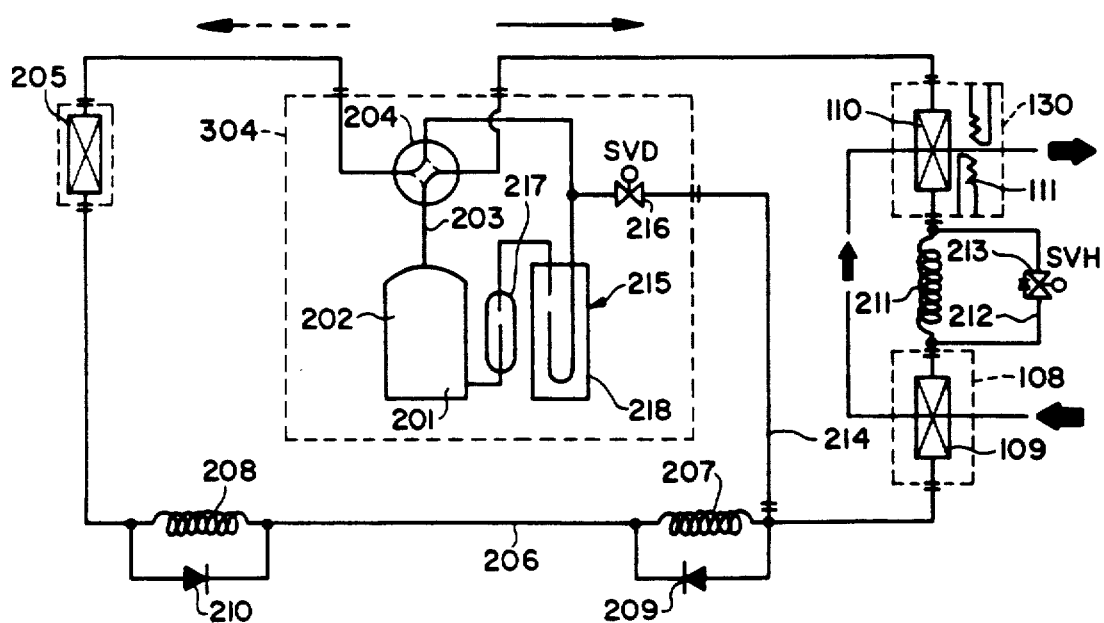
FIG. 2 is a circuit diagram of a refrigerant circulating circuit included in the automotive air conditioner in the first embodiment.

Referring to FIG. 2 showing a refrigeration circuit through which a refrigerant is circulated included in the automotive air conditioner, a compressor 201 with a built-in electric motor, not shown, for compressing a refrigerant is contained in a sealed container 202. The discharge port of the compressor 201 is connected to a selector valve 204 by a discharge line 203. The selector valve 204 delivers the refrigerant discharged from the compressor 201 to the internal heat exchangers 109 and 110 or to an external heat exchanger 205. The internal first heat exchanger 109 and the external heat exchanger 205 are interconnected by a refrigerant line 206. A cooling capillary tube 207 and a heating capillary tube 208 are provided in the refrigerant line 206, and check valves 209 and 210 are connected in parallel to the capillary tubes 207 and 208, respectively.

The second internal heat exchanger 110 provided in the second duct unit 130 is used principally for dehumidification. A dehumidifying capillary tube 211 is disposed between the second internal heat exchanger 110 and the first internal heat exchanger 109. A bypass circuit 212 provided with a reversible solenoid valve 213 is connected in parallel to the dehumidifying capillary tube 211. The reversible solenoid valve 213 always allows the flow of the refrigerant from the first internal heat exchanger 102 toward the second internal heat exchanger 110. The reversible solenoid valve 213 allows the reverse flow of the refrigerant only when its solenoid is energized.

A dehumidifying bypass circuit 214 has one end connected to a line interconnecting the first internal heat exchanger 109 and the cooling capillary tube 207, and the other end connected to a line interconnecting the selector valve 204 and an accumulator 215. A normally closed solenoid valve 216 that opens only when energized is provided in the dehumidifying bypass circuit 214.

The accumulator 215 separates the liquid-phase refrigerant from the vapor-phase refrigerant to supply only the vapor-phase refrigerant to the compressor 201 and to store the liquid-phase refrigerant therein. The capacity of the accumulator 215 is in the range of 50% to 100% of the total charged quantity of the refrigerant. The accumulator 215 comprises a first accumulator 217 incorporated into the compressor 201, and a second accumulator 218 separate from the compressor 201. The total storage capacity of the accumulator 215, namely, the sum of the respective storage capacities of the first accumulator 217 and the second accumulator 218, is on the order of 1300 cm$^3$ because the total quantity of the refrigerant contained in the refrigeration circuit of the automotive air conditioner is on the order of 1500 cm$^3$.

Figure 3:
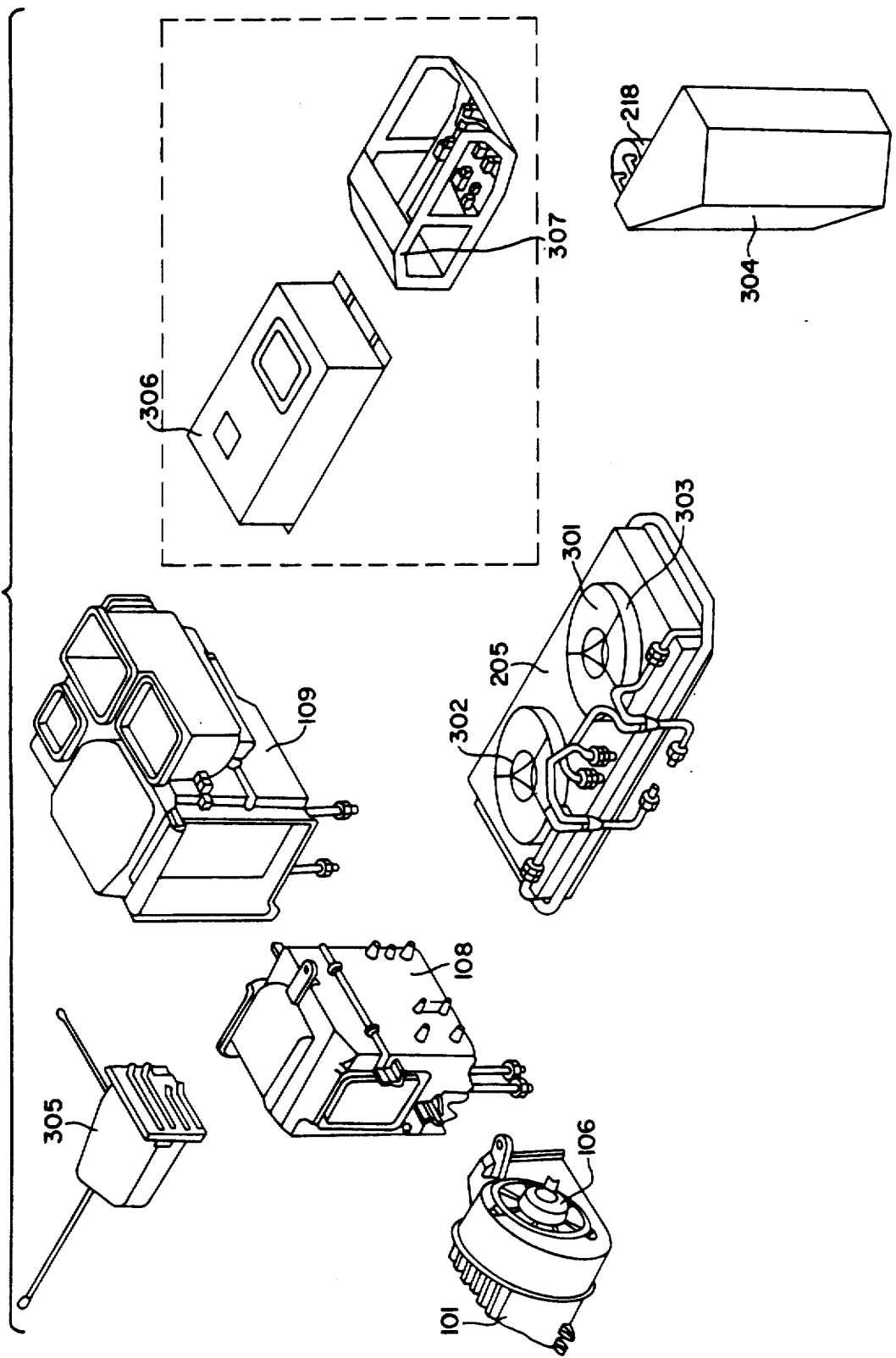
FIG. 3 is a perspective view of the component devices employed in the automotive air condition in the first embodiment.
Figure 4:
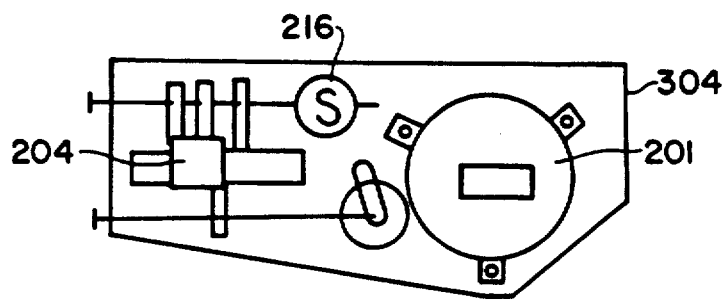
FIG. 4 is a diagrammatic view of a compressor unit shown in FIG. 3.

Referring to FIG. 3, the external heat exchanger 205 is provided with blowers 301 and 302 covered with a fan shroud 303. The external heat exchanger consists of a first heat exchanger and a second heat exchanger. The first and second heat exchangers are connected in parallel to a refrigerant supply line. A compressor unit 304 comprises the compressor 201, the accumulator 218, the selector valve 204 and the solenoid valve 216 as shown in FIG. 4. In FIG. 3, indicated at 305 is an operation panel 305, i.e., temperature adjusting means, at 306 is an inverter, i.e., compressor control means, for controlling the rotating speed of the compressor 201 and at 307 is a control unit, i.e., temperature control means, for controlling the inverter 306.

Figure 5:
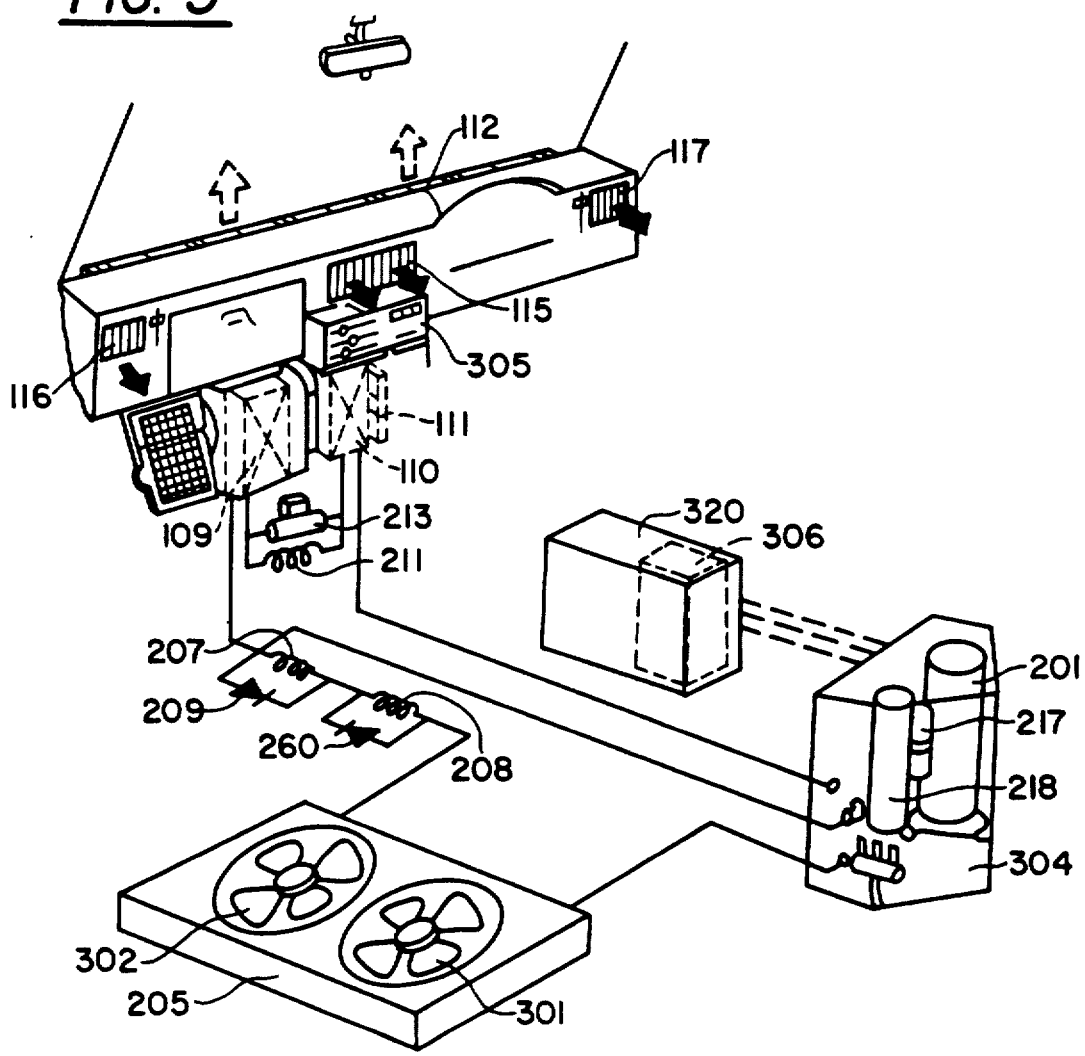
FIG. 5 is a perspective view of the component devices shown in FIG. 3 as mounted on an automobile.

FIG. 5 shows the component devices shown in FIG. 3 as mounted on the automobile. There is not any restriction on the disposition of the compressor 201 because the compressor 201 is driven by the electric motor instead of the engine of the automobile. The electric motor for driving the compressor 201 is a three-phase ac motor. A brushless dc motor may be used instead of the three-phase ac motor. In this specification, an electric controller for the variable-speed control of the brushless dc motor will be referred to as an inverter. The compressor 201 is disposed in the middle or rear portion of the automobile. The external heat exchanger 205 must be disposed at a position where fresh air is sufficiently available for both cooling operation and heating operation. The inverter 306 and the control unit 307 are contained in a box 320.

Figure 6:
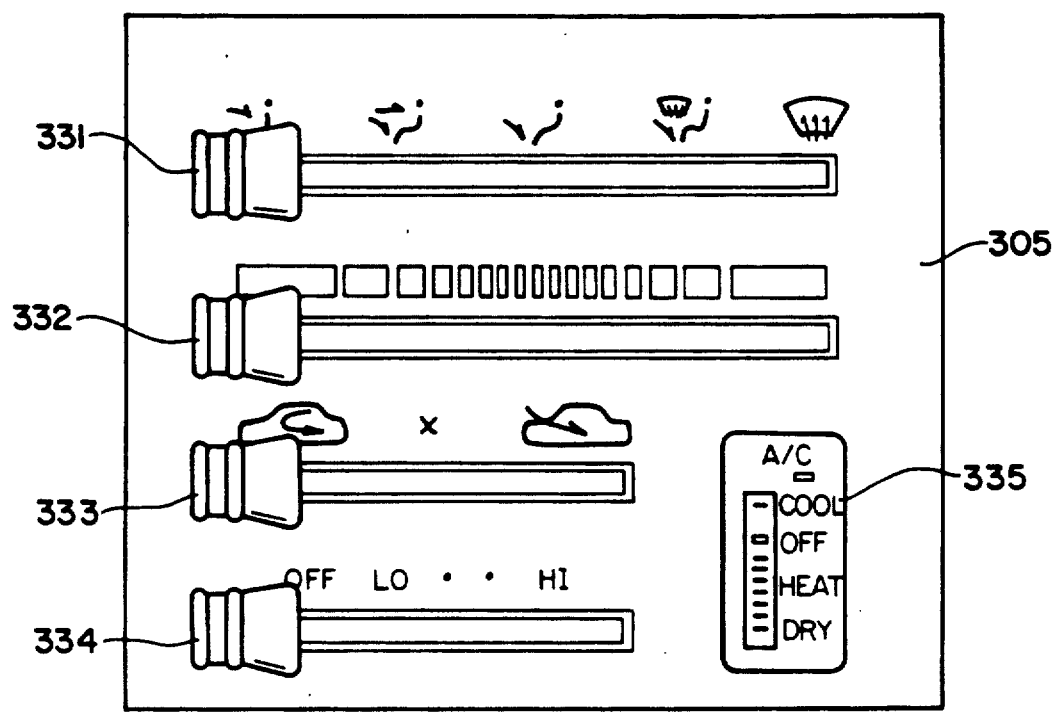
FIG. 6 is a front view of a control panel shown in FIG. 5.

Referring to FIG. 6, the operation panel 305 is provided with a mode selector knob 331, a temperature regulating knob 332, an inlet air selector knob 333, a blower switch 334 and an air conditioner switch 335. The mode selector knob 331 operates the dampers 118, 119, 120, 121 and 122 to select a desired operating mode, namely, an upper level ventilation mode in which the passengers' upper bodies are ventilated, a two-way ventilation mode in which both the passengers' upper bodies and feet are ventilated, a heating mode in which the passengers' feet are ventilated, a heating/defrosting mode in which the passengers' feet and the windshield are ventilated or a defrosting mode in which the windshield is ventilated. The air conditioner switch 335 is used for turning on and off the automotive air conditioner and for selecting a cooling mode, a heating mode or a dehumidifying mode.

Figure 7:
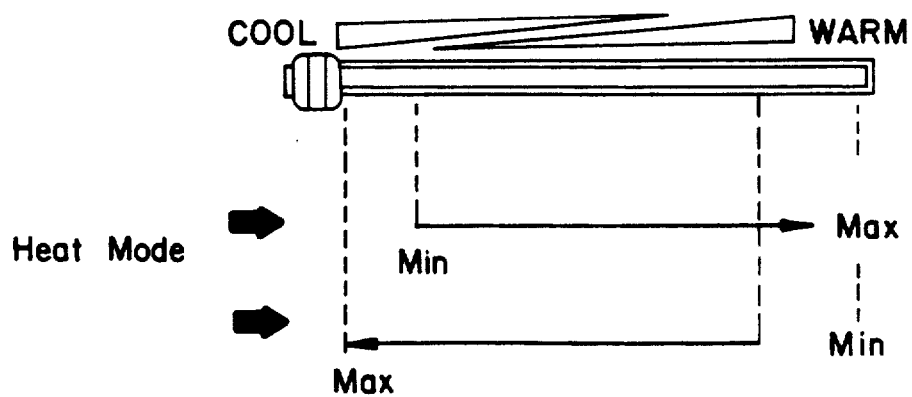
FIG. 7 is a view of assistance in explaining the relation between the position of a temperature regulating knob shown in FIG. 6 and the rotating speed of a compressor.

Referring to FIG. 7, the temperature of the first internal heat exchanger 109 is controlled in the heating mode by operating the temperature regulating knob 332. In the heating mode, the compressor 201 is operated at a minimum rotating speed when the temperature regulating knob 332 is set at a lowest temperature position, and the compressor 201 is operated at a maximum rotating speed when the temperature regulating knob 332 is set at a highest temperature position. The minimum rotating speed may be zero.

In the cooling mode, the compressor 201 is operated at the maximum rotating speed when the temperature regulating knob 332 is set at the lowest temperature position, and the compressor 201 is operated at a lower rotating speed when the temperature regulating knob 332 is set at a higher temperature position. When the temperature regulating knob 332 is set at the highest temperature position, the compressor 201 is stopped.

Figure 8:
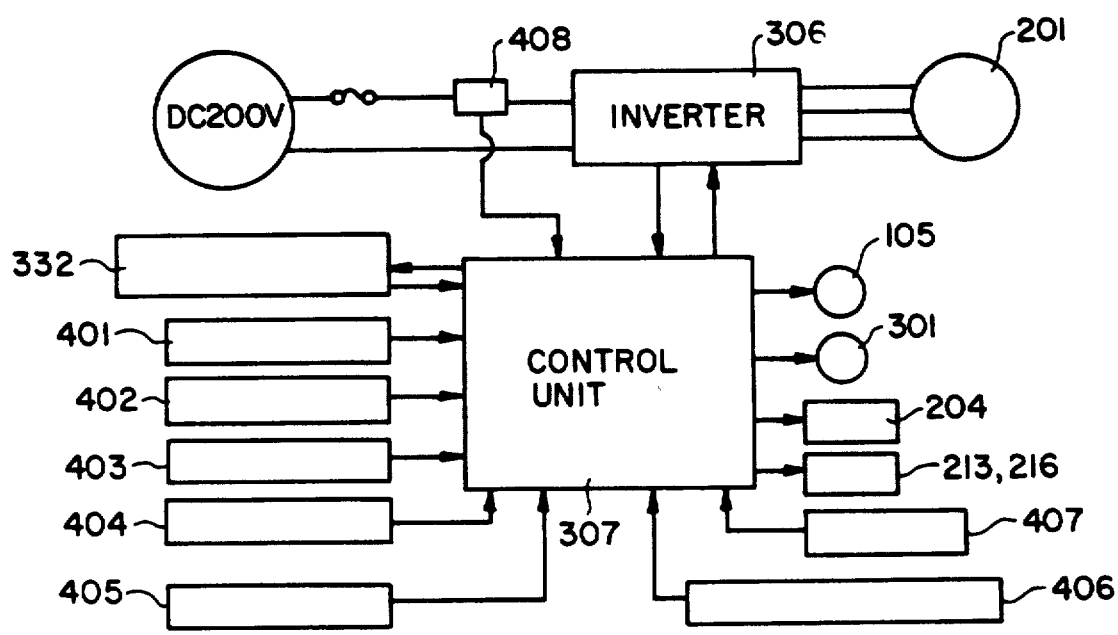
FIG. 8 is a block diagram of a control unit shown in FIG. 3 and devices associated with the control unit.

Referring to FIG. 8, a discharge temperature detector 401 for detecting the temperature of the refrigerant discharged from the compressor 201, an internal heat exchanger temperature detector 402 for detecting the surface temperature of the first internal heat exchanger 109, an external heat exchanger temperature detector 403 for detecting the temperature of the refrigerant in the external heat exchanger 205, a fresh air temperature detector 404 for detecting the temperature of fresh air, a pressure sensor 405 for detecting the pressure of the refrigerant discharged from the compressor 201, compressor temperature detector 406 for detecting the body of the compressor 201, and a high-pressure switch 407 that is closed when the pressure of the refrigerant discharged from the compressor 201 exceeds a threshold pressure are connected to the control unit 307 to give detection signals to the control unit 307. Also given to the control unit 307 is a signal provided by a current detector 408, and a feedback signal representing the condition of the inverter 306. The control unit 307 operates the input signals and gives control signals to the inverter 306, the blower 105, the external blower 301, the selector valve 204 and the solenoid valves 213 and 216.

The input signals to the control unit 307 are used for the following purposes and the control unit 307 controls the inverter 306 to achieve those purposes.

The detection signal provided by the current detector 408 represents an input current supplied to the inverter 306. When the input current supplied to the inverter 306 is excessively high, namely, when the load on the compressor 201 is excessively high, the inverter 306 is controlled so as to reduce the load on the compressor 201. Concretely, the output frequency of the inverter 306 is reduced gradually to reduce the rotating speed of the compressor 201 when the input current supplied to the inverter 306 exceeds a predetermined value.

The output signal of the discharge temperature detector 401 is used for limiting the coil temperature of the motor driving the compressor 201 to a predetermined temperature. For example, when the coil temperature exceeds 115° C., the frequency of the output of the inverter 306 is reduced to reduce the rotating speed of the compressor 201. The output signal of the pressure sensor 405 is used for reducing the excessive discharge pressure of the compressor 201. Concretely, the frequency of the output of the inverter 306 is reduced gradually when the discharge pressure of the compressor 201 exceeds about 26 kg/cm² so that the discharge pressure may be decreased.

The output signal of the internal heat exchanger temperature detector 402 is used for monitoring the condition of the first internal heat exchanger 109 to prevent the internal heat exchanger 109 being frozen during cooling operation. Concretely, the output frequency of the inverter 306 is reduced to reduce the rotating speed of the compressor 201 when the surface temperature of the first internal heat exchanger 109 decreases below 0° C. because it is possible that the first internal heat exchanger 109 is frozen when its surface temperature remains below 0° C. Thus, the refrigerating capacity of the compressor 201 is reduced to prevent the first internal heat exchanger 109 being frozen during cooling operation.

The feedback signal of the inverter 306 is used for regulating the output current of the inverter 306. If the output current of the inverter 306 exceeds a predetermined value, the inverter 306 reduces the frequency of its output to reduce the rotating speed of the compressor 201.

The output signals of the external heat exchanger temperature detector 403 and the fresh air temperature detector 404 are used for detecting the frosting of the external heat exchanger 205 during heating operation. It is decided that frost has been built on the external heat exchanger 205 when the temperature of the fresh air is low, and the difference between the temperature of the fresh air and that of the refrigerant in the external heat exchanger 205 is larged and the frosting of the external heat exchanger 205 is indicated by indicating means, such as a pilot lamp. In such a case, the refrigerating cycle of the automotive air conditioner is reversed temporarily to supply the refrigerant of a high temperature for defrosting.

The output signal of the compressor temperature detector 406 is used for monitoring the thermal condition of the compressor 201 to protect the coils of the electric motor of the compressor 201 from burning. The compressor 201 is stopped temporarily when the temperature of the compressor 201 exceeds, for example, 120° C. The compressor 201 is restarted automatically upon the drop of its temperature below a predetermined temperature.

The high-pressure switch 407 is used for preventing the abnormal increase of the pressure of the refrigerant in the refrigeration circuit. The high-pressure switch 407 disconnects the inverter 306 from the electric motor of the compressor 201 to stop the compressor 201 temporarily when the pressure of the refrigerant discharged from the compressor 201 increases to about 29 kg/cm². The high-pressure switch 407 connects the inverter 306 automatically to the electric motor of the compressor 201 after the pressure of the refrigerant discharged from the compressor 201 has dropped below a predetermined pressure.

The output signal of the inverter 306 is used also for controlling the operation of the compressor 201. Concretely, the output signal of the inverter 306 is used for preventing the low-voltage malfunction of the electric components. If the supply voltage drops below a predetermined voltage, for example, 170 V, the inverter 306 is disconnected from the electric motor of the compressor 201 to stop the compressor 201 temporarily. After the normal voltage has been recovered, the compressor 201 is restarted automatically. The inverter 306 is disconnected from the power source when the supply voltage exceeds, for example, 240 V to prevent the overvoltage failure of the electric components. When the inverter 306 is disconnected from the power source due to overvoltage, the inverter 306 is connected manually to the power source to restart the automative air conditioner. The inverter 306 is disconnected automatically from the power source when the duration of an excessive current, for example, of 150% or above of the rated output current of the inverter 306 exceeds, for example, 120 sec. In this case, the inverter 306 is connected manually to the power source to restart the automotive air conditioner. The temperature of the inverter 306 is detected by a temperature detector. If the temperature of the inverter 306 rises to an abnormally high temperature, the inverter is disconnected from the power source to protect the electric components. In this case also, the inverter 306 is connected manually to the power source to restart the automotive air conditioner.

The operation of the automotive air conditioner thus constructed will be described hereinafter with reference to FIG. 9.

Figure 9:
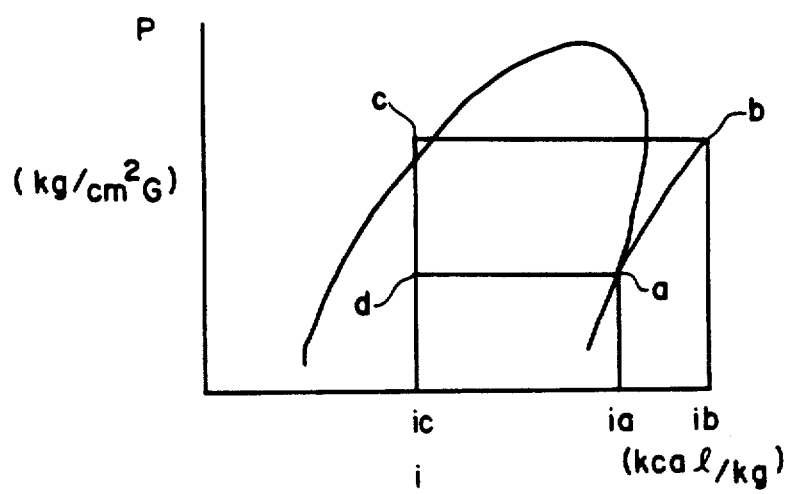
FIG. 9 is a Mollier diagram of assistance in explaining the operation of the automotive air conditioner in the first embodiment.

Referring to FIG. 9, the refrigerant in a state at a point a on the Mollier diagram is compressed adiabatically to a state at a point b by the compressor 201. The refrigerant condenses as its state at the point b changes to a state at a point c on the Mollier diagram, and exchanges heat in the external heat exchanger 205 for cooling operation or in the second internal heat exchanger 110 for heating operation.

The change of state of the refrigerant from the point c to a point d on the Mollier diagram corresponds to pressure reduction in the capillary tube 207 for cooling operation, in the capillary tube 208 for heating operation or in the capillary tube 211 for dehumidifying operation.

The change of state of the refrigerant from the point d to the point a on the Mollier diagram corresponds to evaporation. The refrigerant evaporates in the first internal heat exchanger 109 for cooling operation, in the external heat exchanger 205 for heating operation or in the first internal heat exchanger 109 for dehumidifying operation.

The cooling capacity of the automotive air conditioner is calculated by using $$Q_C = G(i_a - i_c)$$

and the heating capacity of the automotive air condition is calculated by using $$Q_H = G(i_b - i_c)$$

where G is refrigerant circulating rate (kg/hr), and $i_a$, $i_b$ and $i_c$ are the enthalpies of the refrigerant respectively at the points a, b and c.

In the cooling mode, the selector valve 204 is set so that the refrigerant discharged from the compressor 201 flows into the external heat exchanger 205. Then, the high-temperature, high-pressure refrigerant discharged from the compressor 201 condenses in the external heat exchanger 205 into the high-temperature liquid refrigerant, and the high-temperature liquid refrigerant flows through the check valve 210 into the cooling capillary tube 207. During passage through the capillary tube 207, the liquid refrigerant makes adiabatic expansion and changes into low-temperature low-pressure mists, and the mists flows into the first internal heat exchanger 109. The mists of refrigerant exchange heat in the first internal heat exchanger 109 with air supplied to the first internal heat exchanger 109 by the blower 105 and evaporates for cooling. Then, the vapor of the refrigerant flows through the reversible solenoid valve 213 and the second internal heat exchanger 110 into the accumulator 215. The accumulator separates the liquid-phase refrigerant from the vapor-phase refrigerant and returns the vapor-phase refrigerant to the compressor 201.

Figure 10:
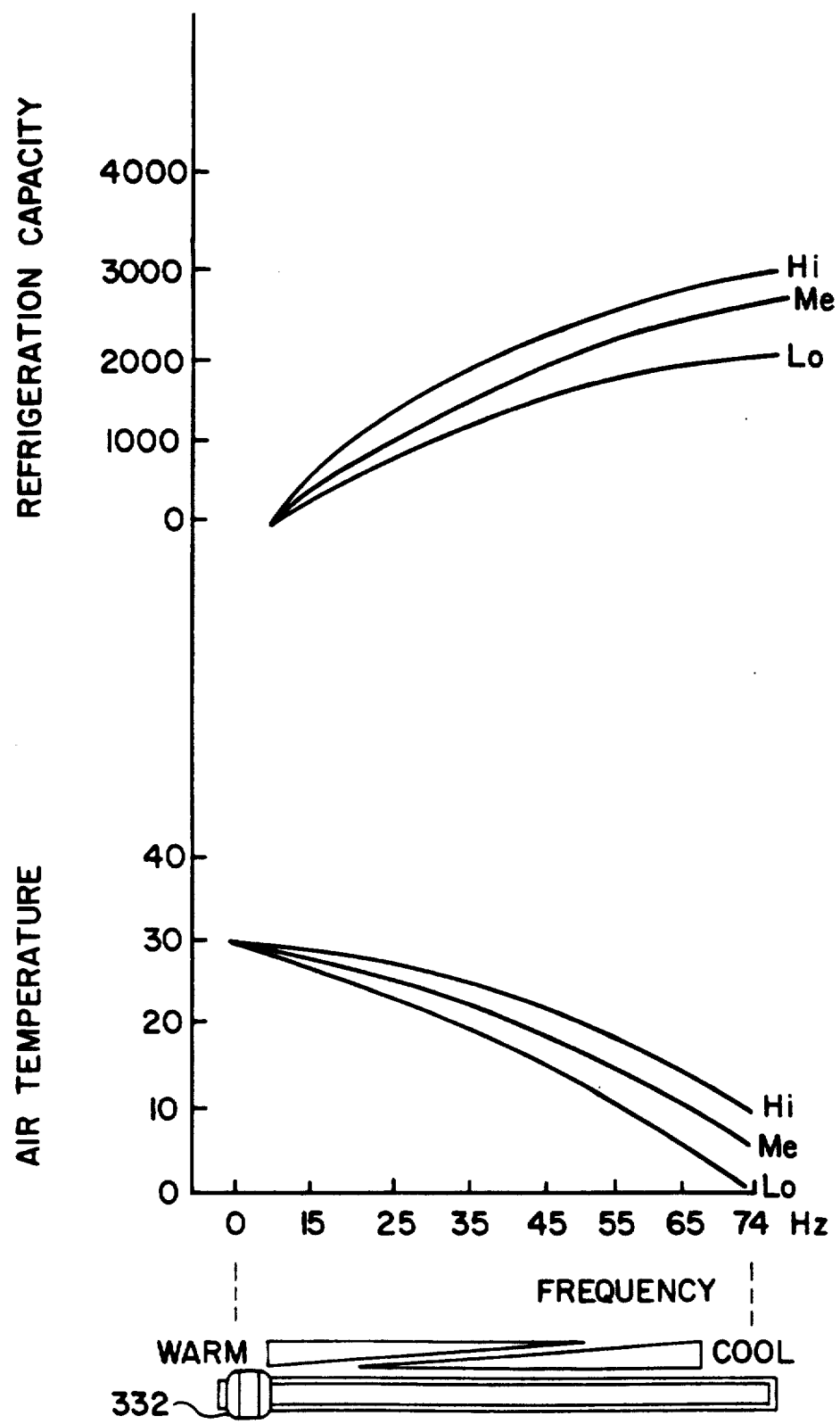
FIG. 10 is a graph showing the relation between the position of the temperature regulating knob, and air temperature and cooling capacity in a cooling mode.

FIG. 10 shows the relation between the position of the temperature regulating knob 332, and the corresponding cooling capacity of the automotive air conditioner and the corresponding temperature of cooled air in cooling operation. In FIG. 10, curves Hi, Me and Lo are those for operating modes in which the blower 105 is operated at a high speed, a medium speed and a low speed, respectively. In a state where the temperature regulating knob 332 is positioned at a position corresponding to the highest temperature, the rotating speed of the compressor 201 is zero and hence the cooling capacity is 0 kcal. In this state, the temperature of air blown into the passenger compartment is equal to that of air sucked by the blower 105. As the temperature regulating knob 332 is shifted toward a position corresponding to the lowest temperature, the frequency of the output of the inverter 306 increases in seven steps. When the frequency of the output of the inverter 306 is a minimum, the three-phase ac motor operates at a minimum rotating speed and hence the compressor 201 operates at a minimum rotating speed; consequently, the flow rate of the refrigerant circulating through the refrigeration circuit is reduced to a minimum. As is obvious from the expression shown above, the cooling capacity is reduced to a minimum according to the reduction of the flow rate of the refrigerant and, consequently, the air flowing through the first internal heat exchanger 109 is not cooled very much and the temperature of air blown into the passenger compartment is only slightly lower than that of air sucked by the blower 105.

As the temperature requlating knob 332 is shifted toward a position corresponding to the lowest temperature, the output frequency of the inverter 306 increases. The three-phase ac motor operates at a maximum rotating speed and hence the compressor 201 operates at a maximum rotating speed when the output frequency of the inverter 306 is a maximum. In this state, the flow rate of the refrigerant circulating through the refrigeration circuit is increased for a maximum cooling capacity and, consequently, the surface temperature of the first internal heat exchanger 109 drops to cool air passing therethrough to a low temperature. Thus, cooled air of a very low temperature is blown through the duct 107 into the passenger compartment.

As is obvious from FIG. 10, the temperature of cooled air and the cooling capacity of the automotive air conditioner are dependent also on the rotating speed of the blower 105. The higher the rotating speed of the blower 105, the greater is the flow rate of air flowing through the duct 107, and hence the higher is the temperature of air blown into the passenger compartment.

In any case, the temperature of air to be blown into the passenger compartment can continuously be varied during cooling operation by regulating the rotating speed of the compressor 201 by means of the temperature regulating knob 332.

The operation of the automotive air conditioner in the heating mode will be described hereinafter. In the heating mode, the selector valve 204 supplies the high-temperature, high-pressure refrigerant discharged from the compressor 201 to the second internal heat exchanger 110. The reversible solenoid valve is opened to allow the refrigerant to flow into the first internal heat exchanger 109, bypassing the defrosting capillary tube 211.

Accordingly, the refrigerant discharged from the compressor 201 condenses in both the first internal heat exchanger 109 and the second internal heat exchanger 110. Then, air flowing through the duct 107 is heated by the heat of condensation of the refrigerant. The refrigerant condensed in the first internal heat exchanger 109 flows through the check valve 209 into the heating capillary tube 208 for adiabatic expansion and low-temperature low-pressure mists of the refrigerant forms in the capillary tube 208. The low-temperature refrigerant absorbs heat from the fresh air in the external heat exchanger 205 and evaporates in a vapor-phase. The vapor-phase refrigerant flows through the selector valve 204 into the accumulator 215. The liquid-phase refrigerant is separated from the vapor-phase refrigerant, and then the vapor-phase refrigerant is sucked into the compressor 201.

Figure 11:
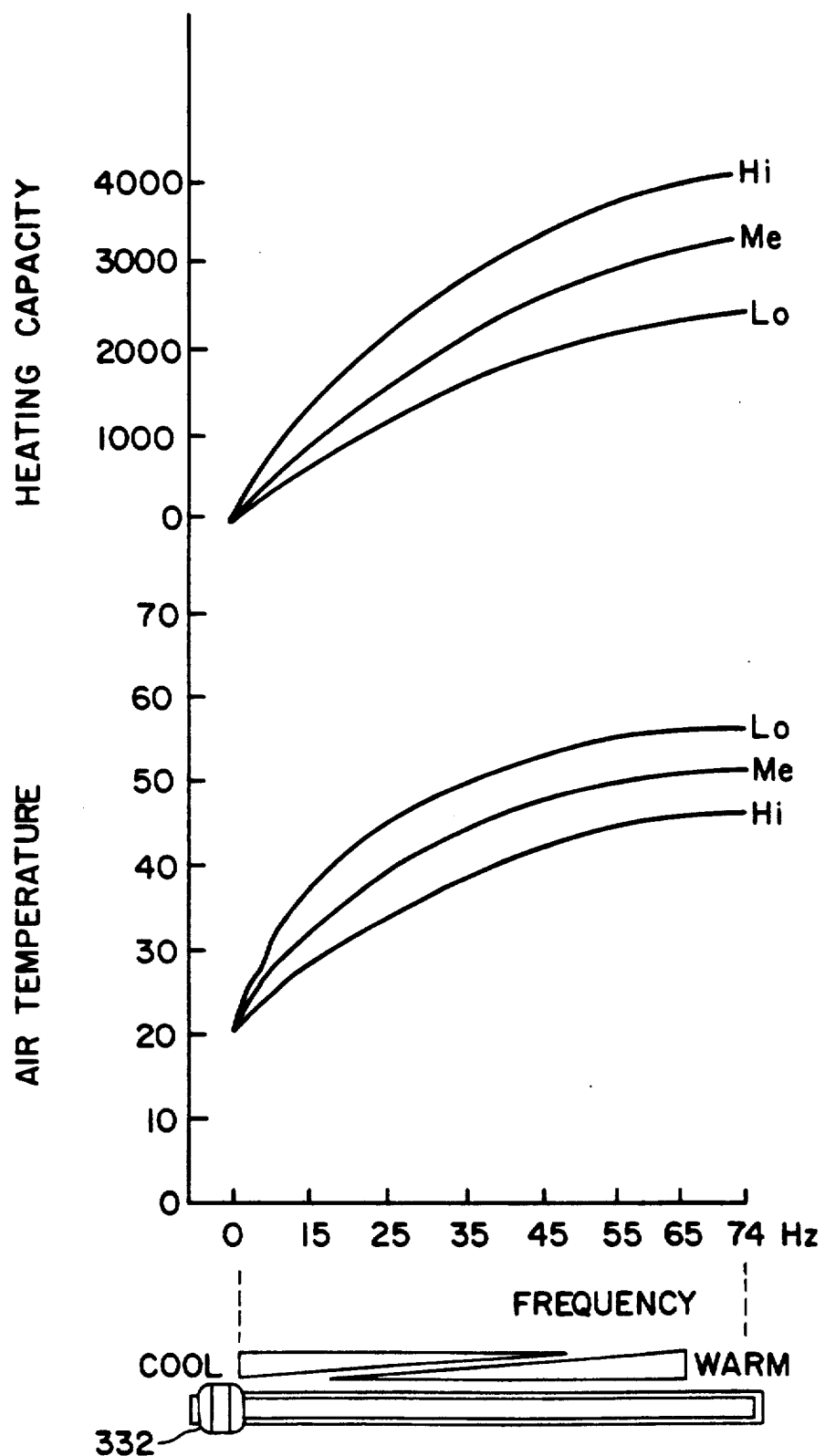
FIG. 11 is a graph showing the relation between the position of the temperature regulating knob, and air temperature and heating capacity in a heating mode.

FIG. 11 shows the relation between the position of the temperature regulating knob 332 in heating operation, and heating capacity and the temperature of air blown into the passenger compartment. When the temperature regulating knob 332 is at a position corresponding to the lowest temperature, the output frequency of the invertor 306 is zero and hence the compressor 201 is stopped. Accordingly, the heating capacity of the automotive air conditioner is 0 kcal, and the temperature of air blown into the passenger compartment is equal to that of air sucked into the blower 105.

As the temperature regulating knob 332 is shifted toward a position corresponding to the highest temperature, the output frequency of the inverter 306 increases and, consequently, the rotating speed of the three-phase ac motor, hence the rotating speed of the compressor 201, increases to increase the flow rate of the refrigerant circulating through the refrigerating circuit. Consequently, the pressure of the refrigerant in the internal heat exchangers 109 and 110 increases and the heat of condensation of the refrigerant increases. As is obvious from FIG. 11, the heating capacity and the temperature of the refrigerant increases with the frequency.

It is also obvious from FIG. 11 that the heating capacity increases and the temperature of air blown into the passenger compartment decreases with the increase of the air capacity of the blower 105. On the contrary, although the temperature of air blown into the passenger compartment increases when the air capacity of the blower 105 is decreased, the heating capacity decreases. Accordingly, the energy efficiency is reduced significantly if the air capacity of the blower 105 is reduced excessively to increase the temperature of air blown into the passenger compartment.

Figure 12:
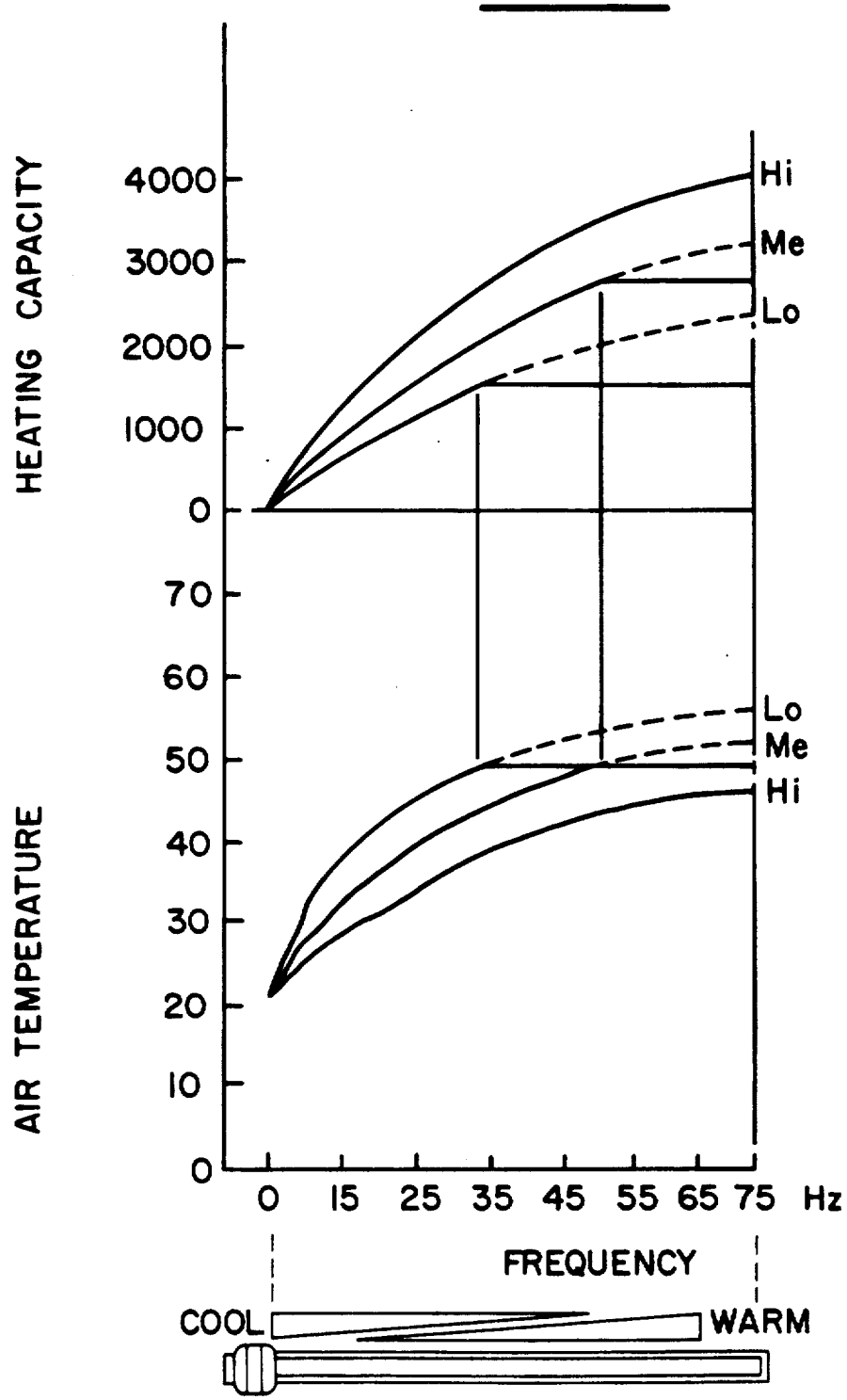
FIG. 12 is a graph showing the relation between the position of the temperature regulating knob, and air temperature and heating capacity.

An automotive air conditioner in a second embodiment according to the present invention incorporates improvements to solve the foregoing problems in the automotive air conditioner in the first embodiment. The performance of the automotive air conditioner in the second embodiment is shown in FIG. 12. In the second embodiment, the highest temperature of air to be blown into the passenger compartment is limited to 50° C. Generally, air of a temperature in the range of 45° to 50° C. is sufficiently effective for making the passengers feel comfortable warmth. Therefore, the automotive air conditioner restrains automatically the increase of the temperature of air beyond 50° C. due to the reduction of the air capacity of the blower 105. Upon the increase of the temperature of air to be blown into the passenger compartment beyond 50° C., the output frequency of the inverter 306 is reduced automatically so that the automotive air conditioner may not continue heating operation in an excessively large heating capacity. As is obvious from FIG. 12, the heating capacity is not increased after the temperature of air blow into the passenger compartment has reached 50° C.

Figure 13:
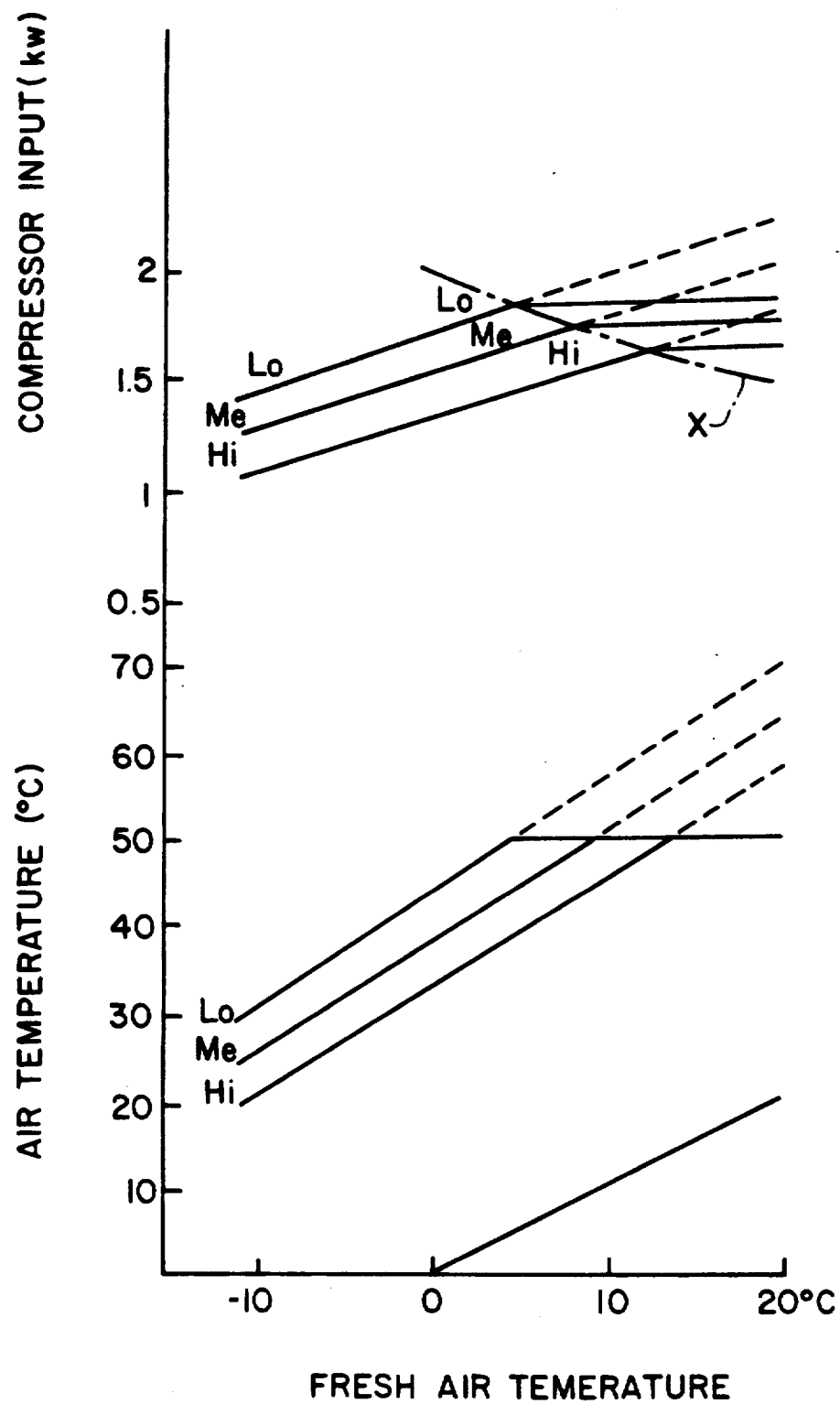
FIG. 13 is a graph showing the temperature relation between incoming air and outgoing air.
Figure 14:
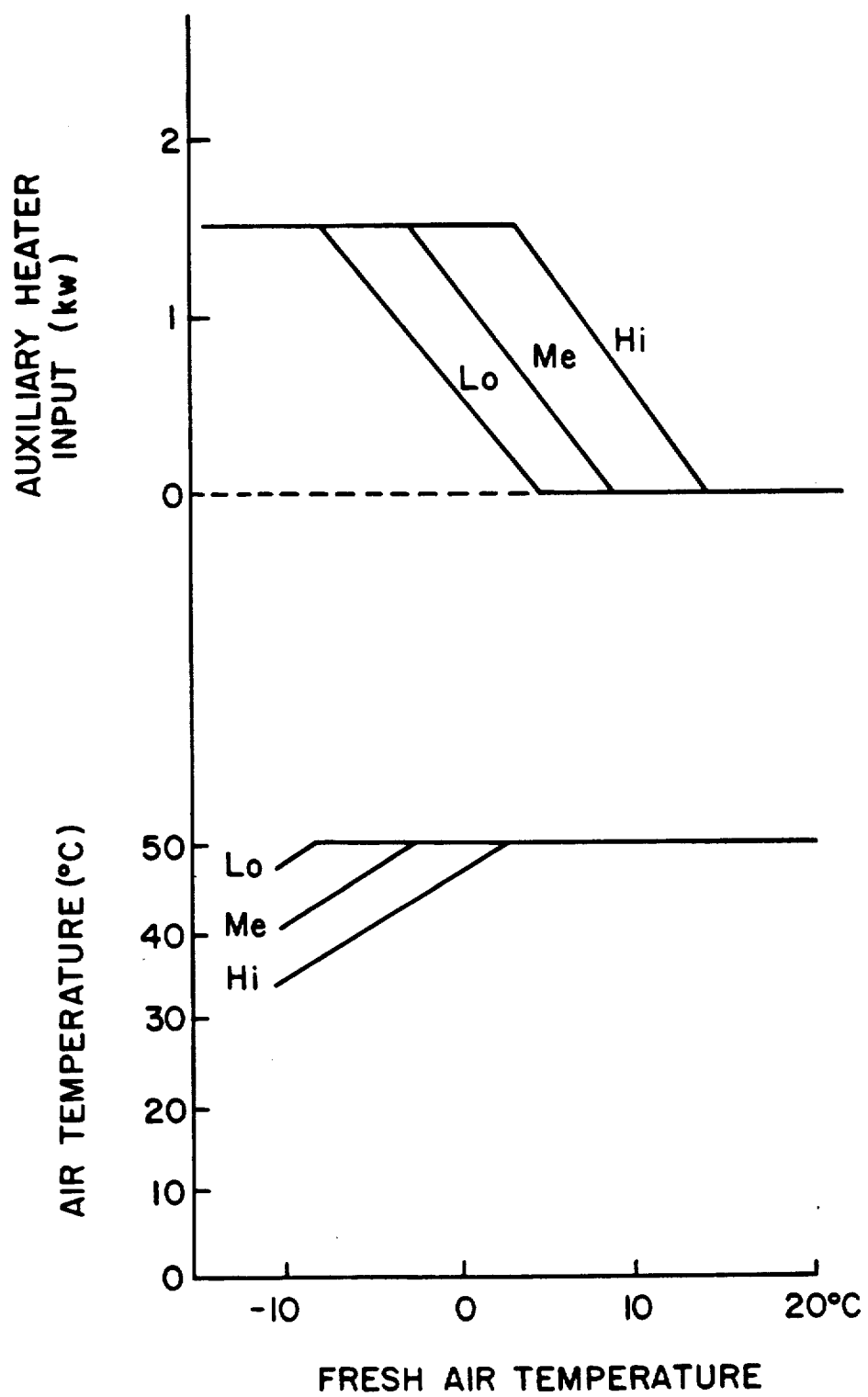
FIG. 14 is a graph of assistance in explaining the performance of an auxiliary heater included in the automotive air conditioner in the first embodiment.

FIG. 13 shows the relation between input power supplied to the compressor 201 and the temperature of air to be blown into the passenger compartment. In FIG. 13, an alternate long and short dash line x indicates input power supplied to the compressor 201 in a state where the temperature of air to be blown into the passenger compartment is 50° C. As mentioned above, the output frequency of the inverter 306 is reduced for the effective increase of the input power.

The temperature of air immediately after the second internal heat exchanger 110 must be higher than 50° C. to blow air of 50° C. into the passenger compartment.

In the heating mode, the internal heat exchangers 109 and 110 heats air flowing therethrough. In some cases it is impossible to heat air to a temperature near 50° C. when the temperature of air sucked by the blower 105 is very low. In such a case, air heated by the internal heat exchangers 109 and 110 is heated further by the auxiliary heater 111 of a heating capacity on the order of 1 kW disposed after the second internal heat exchanger 110. The auxiliary heater 111 is a PTC heater, the power consumption of which increases when the temperature of air supplied thereto is lower than 50° C. and decreases when the temperature of the same is higher than 50° C. The automotive air conditioner is able to blow air of about 50° C. into the passenger compartment by using the auxiliary heater 111 when the blower 105 operates at the minimum air capacity even if the temperature of air sucked by the blower 105 is on the order of 0° C. The auxiliary heater 111 turned on manually when the passenger thinks that the heating capacity is insufficient or may be turned on automatically when the temperature regulating knob 332 is set at a position corresponding to the highest temperature.

The operation of the automotive air conditioner in the dehumidifying mode will be described hereinafter. In the dehumidifying mode, the selector valve 204 supplies the refrigerant discharged from the compressor 201 to the second internal heat exchanger 110, the reversible solenoid valve 213 closes the bypass circuit 212, and the solenoid valve 216 opens the dehumidifying bypass circuit 214.

Consequently, the high-temperature, high-pressure refrigerant discharged from the compressor 201 flows into and condenses in the second internal heat exchanger 110. Then, the refrigerant undergoes adiabatic expansion in the capillary tube 211 and changes into low-temperature, low-pressure mists. The mists of the refrigerant evaporates in the first internal heat exchanger 109 and the vapor-phase refrigerant flows through the dehumidifying bypass circuit 214 and the solenoid valve 216 into the accumulator 215.

Referring again to FIG. 1, the first internal heat exchanger 109 of the first unit functions as an evaporator to cool air flowing therethrough, and the second internal heat exchanger 110 of the second unit functions as a condenser to heat air flowing therethrough. Accordingly, air blown by the blower 105 into the first internal heat exchanger 109 is cooled by the first internal heat exchanger 109 and moisture contained in the air condenses in the first internal heat exchanger and the condensate is drained. Accordingly, the air dehumidified by the first internal heat exchanger 109 flows into the second internal heat exchanger 110, and the dehumidified air is heated by the second internal heat exchanger 110 to provide dry air.

The behavior of the refrigerant during dehumidifying operation will be described with reference to FIG. 9. The refrigerant undergoes a state change from a state corresponding to an enthalpy $i_b$ to a state corresponding to an enthalpy $i_c$ in the second internal heat exchanger 110. The sensible heat of the enthalpy difference between the enthalpies $i_b$ and $i_c$ is used for cooling air, and the latent heat of the same is used for producing drain. Since the latent heat does not contribute to cooling air, the temperature of air passed the first internal heat exchanger 109 and the second internal heat exchanger 110 is heated necessarily for simultaneous heating and dehumidification.

As is obvious from FIG. 11, the temperature of air to be blown into the passenger compartment can be regulated for variable temperature control by operating the temperature regulating knob 332 during simultaneous dehumidification and heating operation. Thus, the automotive air conditioner is able to control the rotating speed of the compressor 201 during the simultaneous dehumidification and heating operation, so that both the dehumidifying capacity and the heating capacity can be controlled by changing the output frequency of the inverter 306.

Figure 15:
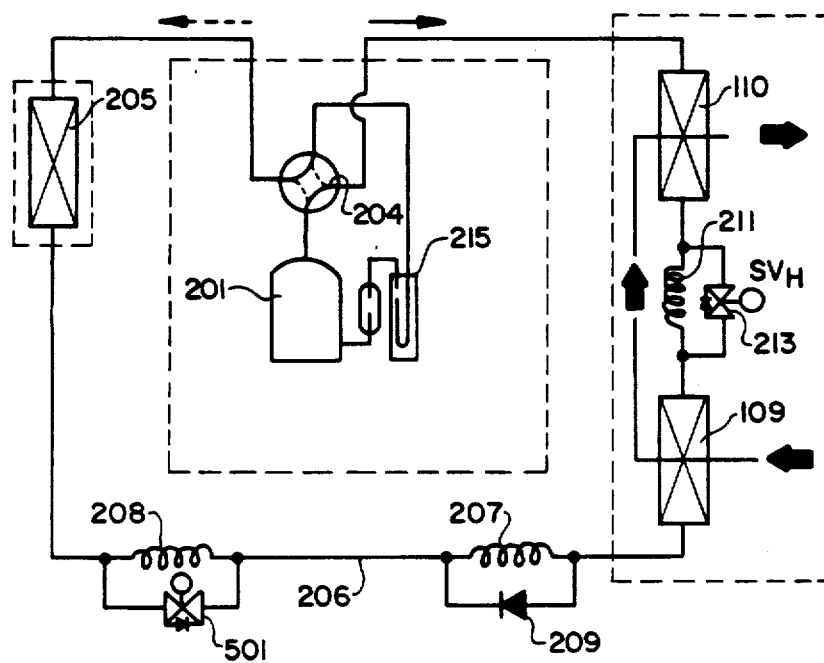
FIG. 15 is a circuit diagram of a refrigeration circuit included in an automotive air conditioner in a second embodiment according to the present invention.
Figure 16:
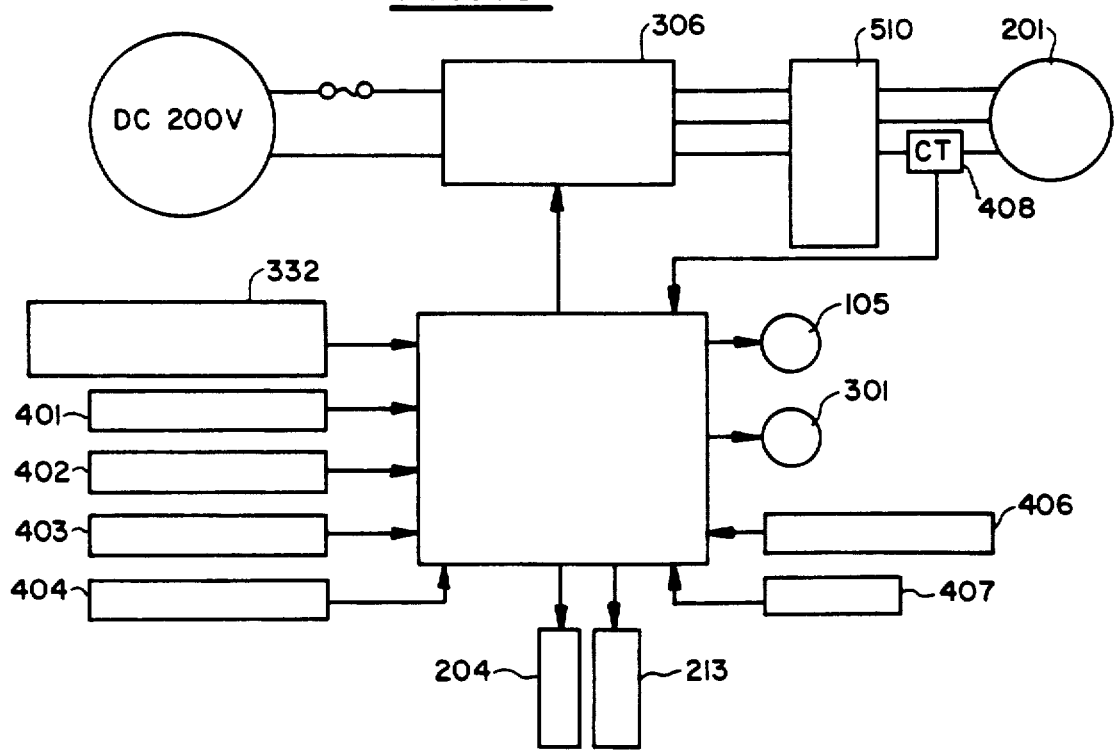
FIG. 16 is a block diagram of a control unit and associated devices included in an automotive air conditioner in a third embodiment according to the present invention.
Figure 17:
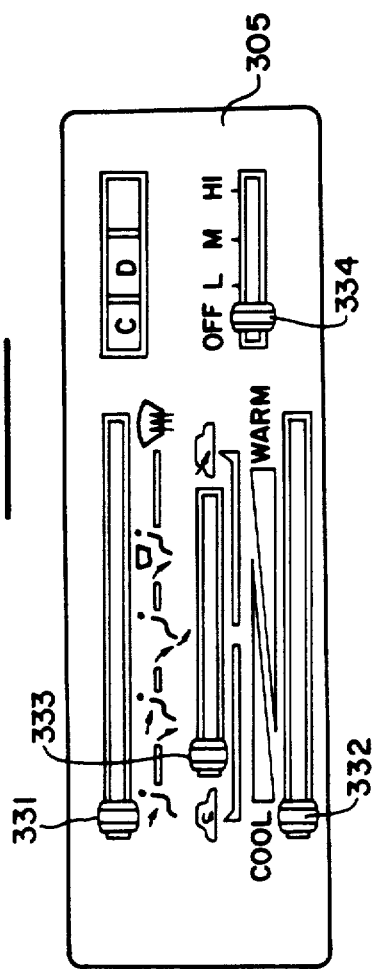
FIG. 17 is a front view of a control panel in accordance with the present invention.
Figure 18:
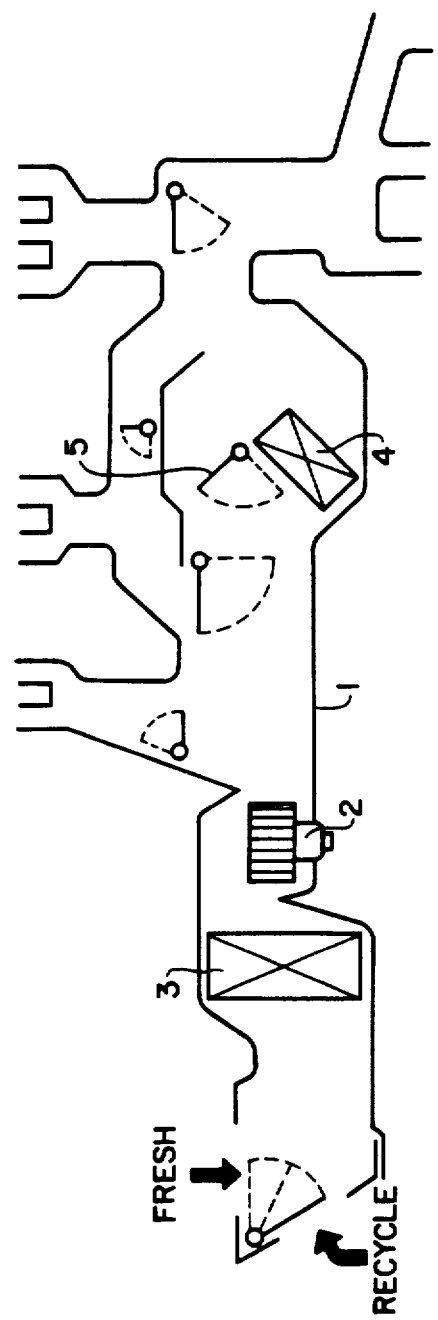
FIG. 18 is a diagrammatic view of a conventional automotive air conditioner.

The automotive air conditioner may employ a regrigeration circuit as shown in FIG. 15, in which the dehumidifying bypass circuit 214 provided with the solenoid valve 216 is omitted and a solenoid valve 501 with a check valve, instead of the check valve 210, is connected in parallel to the heating capillary tube 208.

What is claimed is:

1. An electrically-driven automotive air conditioner comprising:
    a blower for blowing air into a passenger compartment of an automobile;
    a duct for guiding air blown by the blower into the passenger compartment;
    an internal heat exchanger provided within the duct to cool or heat the air flowing through the duct;
    an external heat exchanger for heat exchanging between fresh air and the refrigerant;
    a compressor for supplying a refrigerant to the internal heat exchanger;
    a rotating electric motor for driving the compressor;
    an inverter for producing a driving current having a variable frequency and connecting said driving current to the electric motor so that the compressor operates at a predetermined rotating speed related to the frequency;
    temperature setting means for setting a desired temperature of the air to be blown to the passenger compartment, the temperature setting means varying between a maximum position and a minimum position;

mode switching means for switching a flow of the refrigerant to the internal heat exchanger in a heating mode and to the external heat exchanger in a cooling mode; and control means responsive to the position of the temperature setting means in both heating mode and cooling mode, for controlling an output signal to said inverter to vary the frequency of the current produced by said inverter, the output signal being adjusted to raise the frequency of the driving current of said inverter when the temperature setting means is set toward a cooler position in cooling mode and when the temperature setting means is set toward a hotter position in heating mode.

2. An automative air conditioner according to claim 1, further comprising air outlet selecting means, provided in said duct at a position downstream of said internal heat exchanger with respect to a flowing direction of air, to direct the air flowing through said duct toward the passengers' upper bodies, toward the passengers' feet or toward the windshield of the automobile.

3. An automotive air conditioner according to claim 1 or 2, further comprising an auxiliary electric heater disposed within said duct at a position downstream of said internal heat exchanger with respect to the flowing direction of air.

4. An automotive air conditioner according to claim 3, wherein said auxiliary electric heater is used chiefly for heating.

5. An automotive air conditioner according to claim 1, wherein said mode switching means is a selector valve capable of selectively directing the refrigerant discharged from said compressor to either said internal heat exchanger or said external heat exchanger.

6. An automotive air conditioner according to claim 5, further comprising an accumulator, connected to a suction side of said compressor, for temporarily storing the refrigerant, separating a vapor-phase refrigerant from a liquid-phase refrigerant and supplying only the vapor-phase refrigerant to said compressor.

7. An automotive air conditioner comprising:
a blower for blowing one of recirculating air and fresh air into a passenger compartment of an automobile;
a duct for guiding air blown by the blower into the passenger compartment;
a first internal heat exchanger disposed within the duct;
a second internal heat exchanger disposed within the duct at a position downstream of the first internal heat exchanger with respect to a flowing direction of air;
pressure reducing means for reducing a pressure of the refrigerant and allowing expansion of the refrigerant, provided in a refrigerant line interconnecting the first and second internal heat exchangers;
a compressor for compressing the refrigerant that passes through the first internal heat exchanger, the second internal heat exchanger and the pressure reducing means;
an inverter which produces an electrical power signal which controls a rotating speed of the compressor;
mode switching means for switching a flow of the refrigerant to the second internal heat exchanger in a dehumidifying mode when dehumidifying mode is selected;

temperature setting means for setting a desired temperature of the air to be blown into the passenger compartment, the temperature setting means having a position which varies from a maximum temperature position to a minimum temperature position; and control means responsive to the position of the temperature setting means and controlling an output signal to said inverter to vary the frequency of the current produced by said inverter, said control means producing an output signal which commands raising the frequency of the current to said inverter when the temperature setting means is set toward a cooler position in cooling mode and when it is set toward a hotter position in heating mode, the inverter varying the rotating speed of the compressor corresponding to the output signal from the control means.

8. An automotive air conditioner according to claim 7, further comprising bypass means connected in parallel to said pressure reducing means to make the refrigerant bypass the pressure reducing means during dehumidifying operation.

9. An automotive air conditioner comprising:
a blower for blowing air;
a duct for guiding air blown by the blower into a passenger compartment of an automobile;
an internal heat exchanger disposed within the duct;
a compressor driven by an electric motor to compress and discharge a refrigerant;
an external heat exchanger for heat exchanging between the fresh air and the refrigerant;
a selector valve for directing the refrigerant discharged from the compressor to either the internal heat exchanger in a heating mode or to the external heat exchanger in a cooling mode;
an external blower for supplying the fresh air to the external heat exchanger;
an inverter for producing a driving current having a variable frequency and connecting said driving current to the electric motor so that the compressor operates at a predetermined rotating speed related to the frequency;
temperature setting means for setting a desired temperature of air blown through the duct into the passenger compartment, the temperature setting means having a position which can vary from a maximum air temperature position to a minimum air temperature position;
control means, responsive to the position of the temperature setting means in both a heating mode and in a cooling mode, for controlling an output signal to said inverter to vary the frequency of the current produced by said inverter, said control means providing an output signal raising the frequency of the current to said inverter when the temperature setting means is set toward a cooler position in cooling mode and when it is set toward a hotter position in heating mode;
temperature detecting means for detecting a temperature of the refrigerant discharged from the compressor;
internal heat exchanger temperature detecting means for detecting a surface temperature of the internal heat exchanger;
current detecting means for detecting an input current of the inverter; and pressure detecting means for detecting a pressure of the refrigerant on a discharge side of the compressor;

wherein the control means controls the output signal to said inverter to receive at least one of the output signals of the temperature regulating means, the discharge temperature detecting means, the internal heat exchanger temperature detecting means, the current detecting means and the pressure detecting means.

* * * * *

UNITED STATES PATENT AND TRADEMARK OFFICE
CERTIFICATE OF CORRECTION

PATENT NO.    :    5,316,074

DATED         :    MAY 31, 1994

INVENTOR(S)   :    ISAJI et al

It is certified that error appears in the above-identified patent and that said Letters Patent is hereby corrected as shown below:

Title page,

Please change:

item "[54]  AUTOMOTIVE HAIR CONDITIONER to

-- [54]  AUTOMOTIVE AIR CONDITIONER --

Signed and Sealed this

First Day of August, 1995

Attest:

BRUCE LEHMAN

*Attesting Officer*     Commissioner of Patents and Trademarks